US009568757B2

(12) United States Patent
Lee

(10) Patent No.: US 9,568,757 B2
(45) Date of Patent: Feb. 14, 2017

(54) DISPLAY DEVICE HAVING MOLD FRAME WITH ELASTIC PROTECTIVE MEMBER

(71) Applicant: Samsung Display Co., Ltd., Yongin (KR)

(72) Inventor: Yong Jun Lee, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 135 days.

(21) Appl. No.: 14/619,939

(22) Filed: Feb. 11, 2015

(65) Prior Publication Data

US 2016/0054613 A1 Feb. 25, 2016

(30) Foreign Application Priority Data

Aug. 22, 2014 (KR) .................. 10-2014-0109591

(51) Int. Cl.
*G02F 1/1333* (2006.01)
(52) U.S. Cl.
CPC ........... *G02F 1/133308* (2013.01); *G02F 2001/133317* (2013.01); *G02F 2001/133322* (2013.01); *G02F 2201/46* (2013.01); *G02F 2201/503* (2013.01)
(58) Field of Classification Search
CPC ........... G02F 1/133308; G02F 2001/133317; G02F 2001/133322; G02F 2001/133328; G02F 2201/465503
USPC .......................................... 349/60
See application file for complete search history.

(56) References Cited

U.S. PATENT DOCUMENTS

| 2001/0026334 A1* | 10/2001 | Natsuyama ....... G02F 1/133308 349/58 |
| 2007/0115207 A1* | 5/2007 | Jang ................ G02F 1/133308 345/32 |
| 2007/0115401 A1* | 5/2007 | Tsubokura ............ G02F 1/1333 349/58 |
| 2009/0122217 A1* | 5/2009 | Chen ................ G02F 1/133308 349/58 |
| 2012/0268868 A1* | 10/2012 | Yoon ................ G02F 1/133308 361/679.01 |

FOREIGN PATENT DOCUMENTS

| KR | 10-2004-0061671 | 7/2004 |
| KR | 10-2005-0113756 | 12/2005 |
| KR | 10-0528011 | 2/2006 |
| KR | 10-2014-0038855 | 3/2014 |

* cited by examiner

*Primary Examiner* — Anh Mai
*Assistant Examiner* — Steven Horikoshi
(74) *Attorney, Agent, or Firm* — H.C. Park & Associates, PLC

(57) ABSTRACT

A display device includes: a display panel; a backlight unit disposed above the display panel and configured to provide light to the display panel; a mold frame disposed between the display panel and the backlight unit and including a sidewall portion, which is formed to define an opening, a support portion, which extends from the sidewall portion toward the opening and supports the display panel, and at least one coupling groove portion, which is formed on an inner side of the sidewall portion; and at least one protective member including a coupling protrusion portion, which is inserted into the coupling groove portion, and a contact portion, which is disposed between an inside of the sidewall portion and an outside of the display panel and is connected to the coupling protrusion portion.

16 Claims, 15 Drawing Sheets

DISPLAY DEVICE HAVING MOLD FRAME WITH ELASTIC PROTECTIVE MEMBER

CROSS-REFERENCE TO RELATED APPLICATION

This application claims priority to Korean Patent Application No. 10-2014-0109591, filed on Aug. 22, 2014, which is hereby incorporated by reference for all purposes as if fully set forth herein.

BACKGROUND

Field

Exemplary embodiments relate to a display device.

Discussion of the Background

A liquid crystal display (LCD) device includes two glass substrates and a liquid crystal layer interposed between the two glass substrates, and displays an image by applying power to electrodes disposed on the two glass substrates so as to vary the alignment of liquid crystal molecules in each pixel.

The LCD device, unlike a cathode ray tube (CRT) display device or a plasma display panel (PDP) display device, is not self-emissive, and cannot be used in places where there is no light. For this reason, the LCD device may include a backlight unit, which uniformly applies light to a display panel for the LCD device to be used in a dark area.

More specifically, the LCD device may include a frame mold, which is disposed between the display panel and the backlight unit and receives and supports the display panel therein. The frame mold may be formed of a resin, such as polycarbonate (PC).

However, in response to external shocks being applied to the frame mold where the display panel is received, stress from the external shock may be concentrated on various parts of the frame mold and, in particular, the corners of the frame mold. In this case, the display panel may crack or break in portions that are in contact with various parts of the frame mold and, in particular, the corners of the frame mold.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device capable of protecting a display panel against external shock.

Additional aspects will be set forth in the detailed description which follows, and, in part, will be apparent from the disclosure, or may be learned by practice of the inventive concept.

An exemplary embodiment of the present invention discloses a display device discloses: a display panel; a backlight unit disposed above the display panel and configured to provide light to the display panel; a mold frame disposed between the display panel and the backlight unit and including a sidewall portion, which is formed to define an opening, a support portion, which extends from the sidewall portion toward the opening and supports the display panel, and at least one coupling groove portion, which is formed on an inner side of the sidewall portion; and at least one protective member including a coupling protrusion portion, which is inserted into the coupling groove portion, and a contact portion, which is disposed between an inside of the sidewall portion and an outside of the display panel and is connected to the coupling protrusion portion.

An exemplary embodiment of the present invention discloses a display device including: a display panel; a backlight unit disposed above the display panel and configured to provide light to the display panel; a mold frame disposed between the display panel and the backlight unit and including a sidewall portion, which is formed to define an opening, a support portion, which extends from the sidewall portion toward the opening and supports the display panel, and at least one coupling groove portion, which is formed on an inner side of the sidewall portion; and at least one protective member formed of an elastic material, coupled into the coupling groove portion and disposed between an inside of the sidewall portion and an outside of the display panel.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
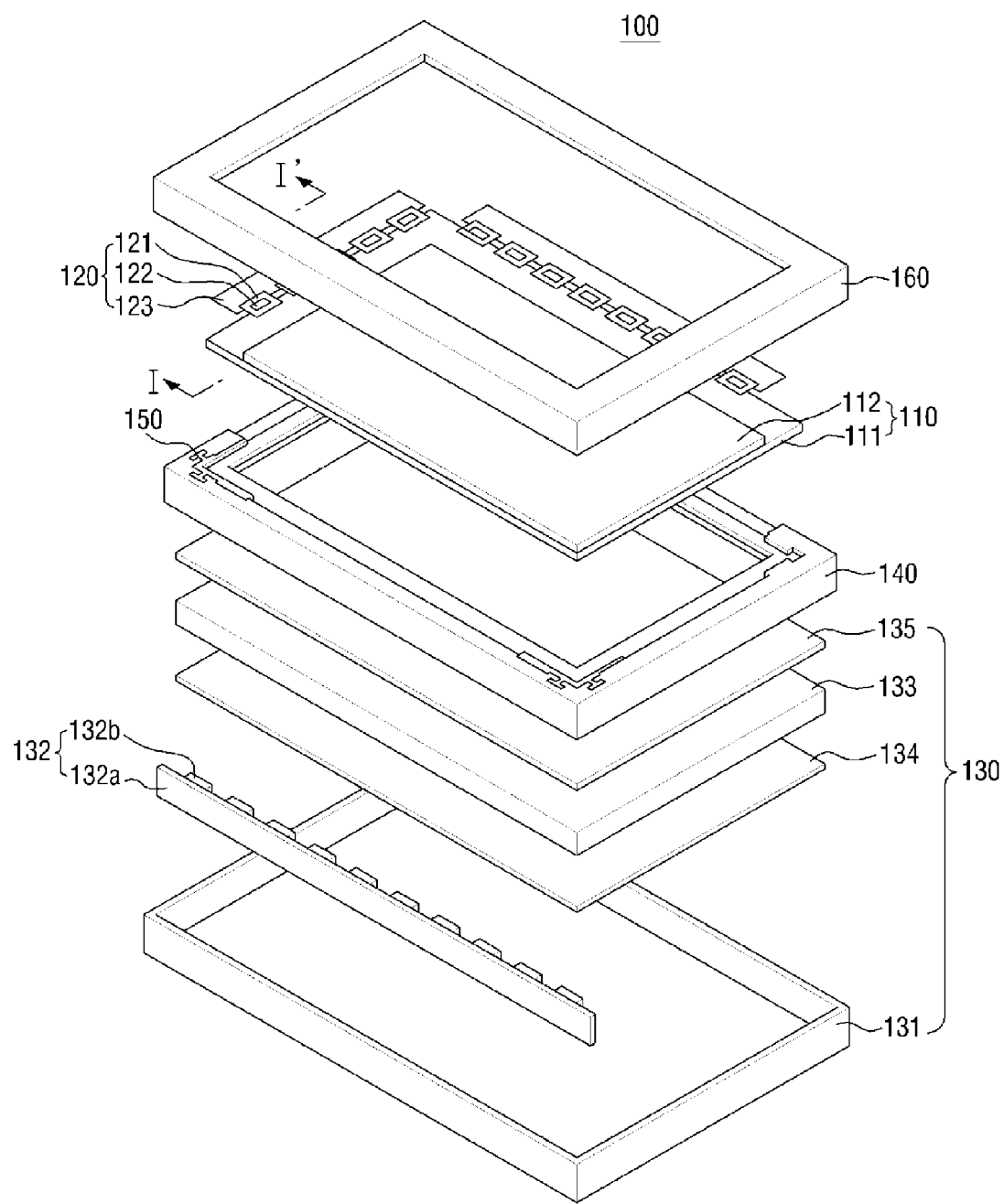
FIG. 1 is an exploded perspective view of a display device according to an exemplary embodiment of the invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

It will also be understood that when a layer is referred to as being "on" or "connected to" another element or layer, it can be directly on or directly connected to the other element or layer, or intervening elements or layers may also be present. In contrast, when an element or layer is referred to as being "directly on" or "directly connected to" another element or layer, there are no intervening elements or layers present. It will be understood that for purposes of this disclosure, "at least one of X, Y, and Z" can be construed as X only, Y only, Z only, or any combination of two or more items X, Y, and Z (e.g., XYZ, XYY, YZ, ZZ). In the drawings, the size and relative sizes of layers and regions may be exaggerated for clarity. The same reference numbers indicate the same components throughout the specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Exemplary embodiments of the invention will hereinafter be described with reference to the accompanying drawings.

Figure 2:
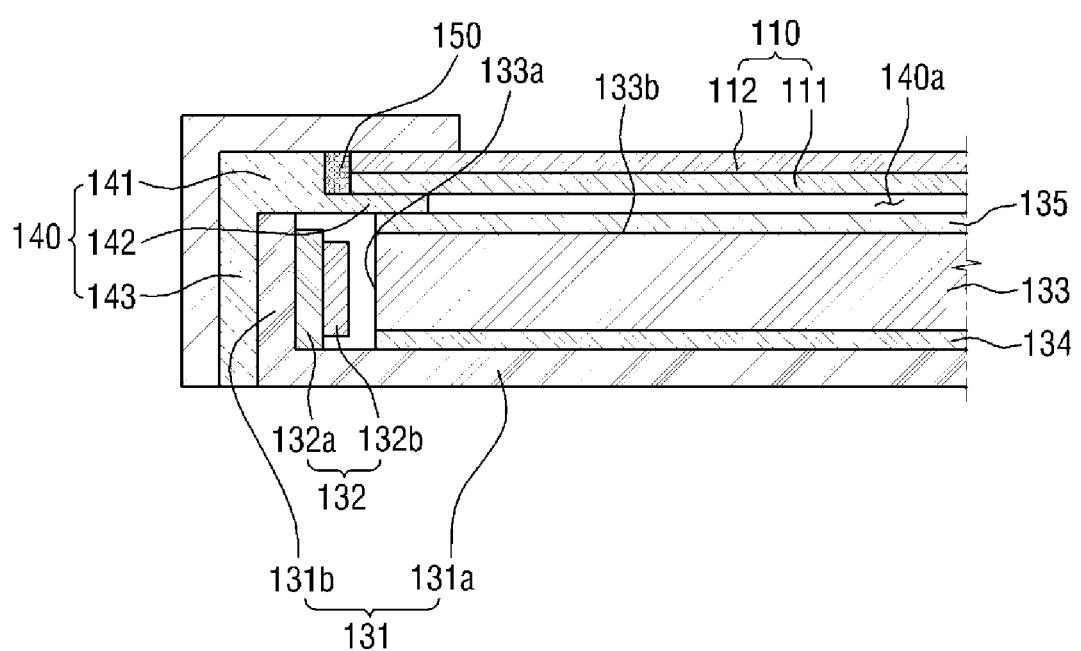
FIG. 2 is an assembled cross-sectional view taken along line I-I' of FIG. 1.
Figure 3:
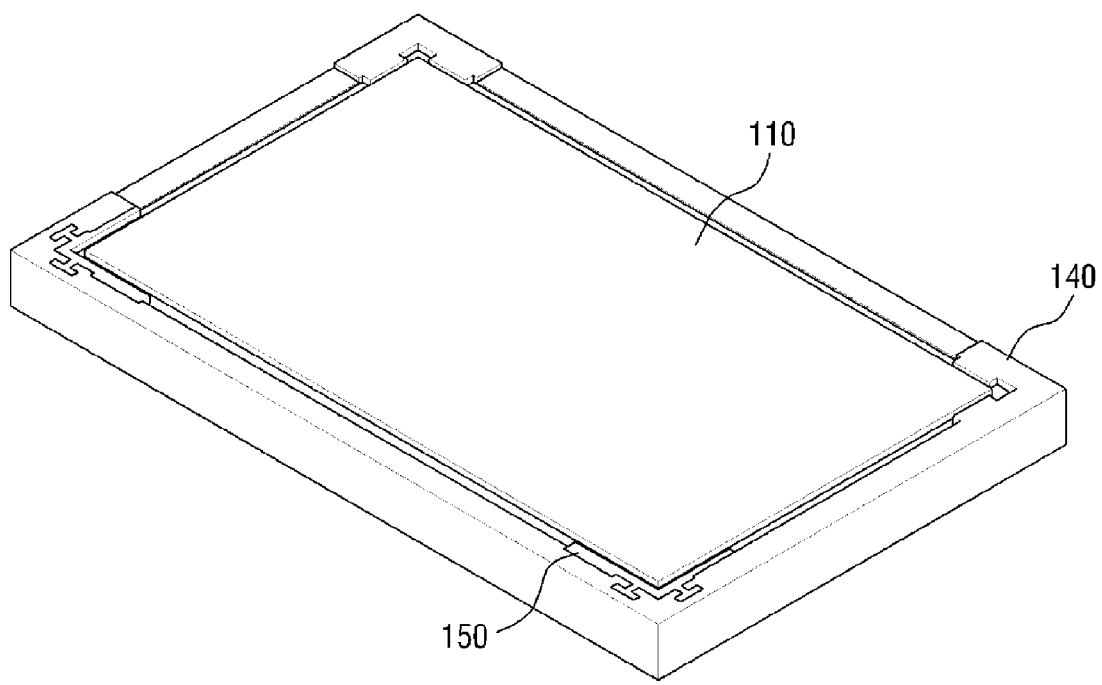
FIG. 3 is an assembled perspective view of a display panel, a mold frame and protective members illustrated in FIG. 1.

Referring to FIGS. 1 to 3, a display device 100 includes a display panel 110 and a backlight unit 130, which is disposed below the display panel 110.

The display panel 110 may include a lower display panel 111 and an upper display panel 112, which face each other. The lower display panel 111 and the upper display panel 112 may be coupled together by a sealing material (not illustrated). A liquid crystal layer (not illustrated) may be interposed between the lower display panel 111 and the upper display panel 112. A polarizing sheet (not illustrated) may be attached onto the exterior of the lower display panel 111 and the upper display panel 112.

A plurality of pixel electrodes, interconnections for driving the pixel electrodes, and a plurality of switching devices may be formed on the lower display panel 111. A common electrode may be provided on the upper display panel 112 or the lower display panel 111, and may apply an electric field to the liquid crystal layer. A color filter and a black matrix may be formed on the upper display panel 112 or the lower display panel 111.

One or more driving units 120 may be installed on at least one side of the lower display panel 111. Each of the driving units 120 may include a flexible printed circuit board (FPCB) 121, a driving chip 122, which is mounted on the FPCB 121, and a printed circuit board (PCB) 123, which is connected to the FPCB 121.

The backlight unit 130 may include a lower container 131, a light source module 132, a light guide plate 133, a reflective sheet 134, and one or more optical sheets 135.

The lower container 131 may include a bottom plate 131*a* and sidewalls 131*b*, and may receive the light source module 132, the light guide plate 133, the reflective sheet 134, and the optical sheets 135 therein. The lower container 131 may function as a bottom chassis.

The light source module 132 may be received in at least one side of the lower container 131, and may provide light to the display panel 110. The light source module 132 may include a PCB 132*a* and a plurality of light sources 132*b* mounted on the PCB 132*a*.

The PCB 132*a* provides space for mounting the light sources 132*b*, and includes an interconnection layer for providing a path for supplying power to the light sources 132*b*. The PCB 132*a* may be formed as a bar extended along the side of the lower container 131.

The light sources 132*b* may be arranged on the PCB 132*a* along the side of the lower container 131, and may be isolated from one another. The light sources 132*b* may emit light toward the light guide plate 133. The light sources 132*b* may have lateral directivity, and may each include a light source device, such as a light-emitting diode (LED).

The light guide plate 133 may be disposed at the bottom plate 110 of the lower container 131 to face the light sources 132*b*. The light guide plate 133 may include an incidence surface (or a lateral surface) 133*a* upon which light emitted from the light sources 132*b* is incident, and an emission surface (or a top surface) 133*b* through which the incident light is guided and emitted toward the display panel 110. That is, the light guide plate 133 guides light provided by the light sources 132*b* to be emitted toward the display panel 110.

The light guide plate 133 may be formed as a rectangular plate, and may be formed of a transparent material capable of refracting light. In an exemplary embodiment, the transparent material may be, for example, a transparent polymer material, such as polycarbonate (PC) or polymethyl methacrylate (PMMA). The light guide plate 133 may be formed of a rigid material or a flexible material. The light guide plate 133 may be formed as a plate in the shape of a cuboid. In the description that follows, it is assumed that the light guide plate 133 is formed as a plate in the shape of a cuboid, but the invention is not limited thereto. That is, the light guide plate 133 may be formed in various shapes other than a cuboid.

The reflective sheet 134 may be disposed between the bottom of the light guide plate 133 and the bottom plate 110 of the lower container 131. The reflective sheet 134 may reflect light leaked from the light sources 132*b* without being transmitted to the light guide plate 133 to travel toward the display panel 110.

The optical sheets 135 are disposed above the light guide plate 133, and modulate light supplied thereto via the light guide plate 133. A prism sheet, a diffuser sheet, a micro-lens array sheet, a lenticular sheet, a phase difference compensation sheet, and a reflective polarizing sheet may be used as the optical sheets 135.

The mold frame 140 is disposed between the display panel 110 and the backlight unit 130, and receives and supports the display panel 110 therein. The mold frame 140 may be formed of a resin, such as PC. The mold frame 140 includes a sidewall portion 141, a support portion 142, and an extension portion 143. The sidewall portion 141 defines an opening 140*a* and thus, allows light emitted from the backlight unit 130 to be provided to the display panel 110. The support portion 142 extends from the sidewall portion 141 toward the opening 140*a*, and substantially supports the display panel 110. The extension portion 143 extends from the sidewall portion 141 toward the backlight unit 130, and is coupled to the sidewalls 131*b* of the lower container 131.

Figure 4:
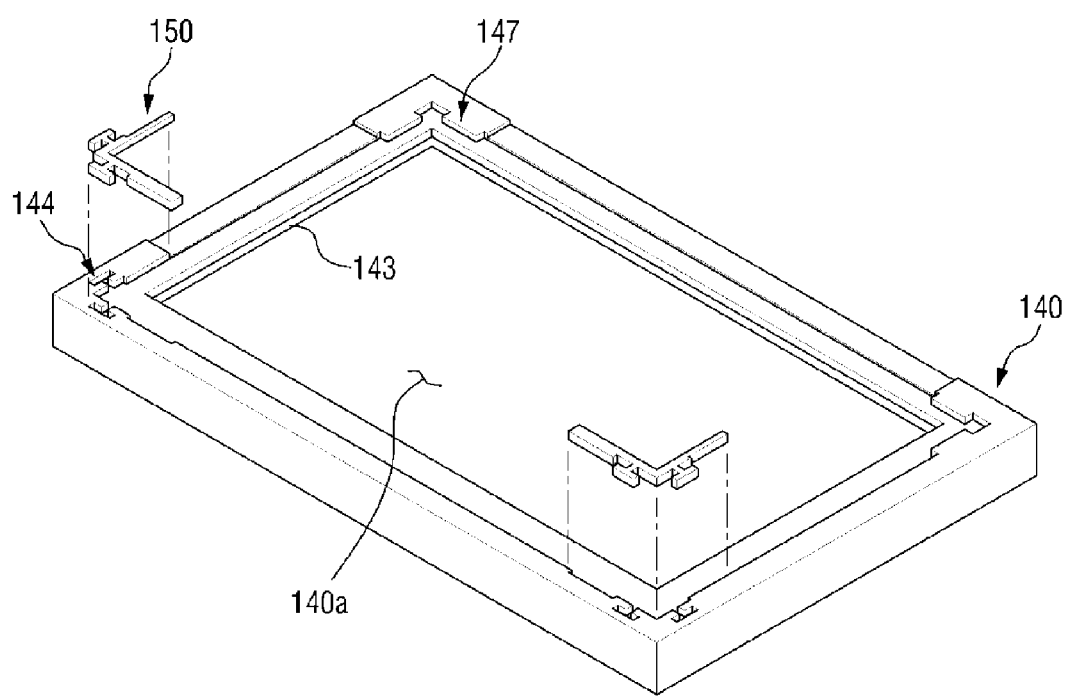
FIG. 4 is an exploded perspective view of the mold frame and the protective members of FIG. 3.

The mold frame 140 may also include at least one coupling groove portion 144 and at least one guide protrusion portion 147, as illustrated in FIG. 4. The mold frame 140 will be described later in further detail.

At least one protective member 150 is provided between the mold frame 140 and the display panel 110, and is coupled to the mold frame 140. The top surface of the protective member 150 and the top surface of the sidewall portion 141 of the mold frame 140 may be on the same level with each other. The protective member 150 may serve as a guide for receiving the display panel 110 in the mold frame 140. The protective member 150 may be formed of an elastic material, such as silicon or rubber, and may thus, reduce the movement of the display panel 110 inside the mold frame 140. The protective member 150 may absorb external shock that may be applied to the display panel 110 in a case when the mold frame 140 with the display panel 110 accommodated therein is dropped, and may thus, prevent the display panel 110 from cracking or breaking. The protective member 150 will be described later in further detail.

An upper container 160 is disposed above the display panel 110. The upper container 160 may be a top chassis or a bezel. The upper container 160 has an open window, and covers and protects the top edges of the display panel 110. The upper container 160 may be coupled to the mold frame 140, and particularly, to the extension portion 143. The inner surface of the upper container 160 may contact the top surface of the protective member 150. Accordingly, the upper container 160 may prevent the protective member 150 from being detached from the mold frame 140.

The structures of the mold frame 140 and the protective member 150 will hereinafter be described with reference to FIGS. 5 to 7.

Figure 5:
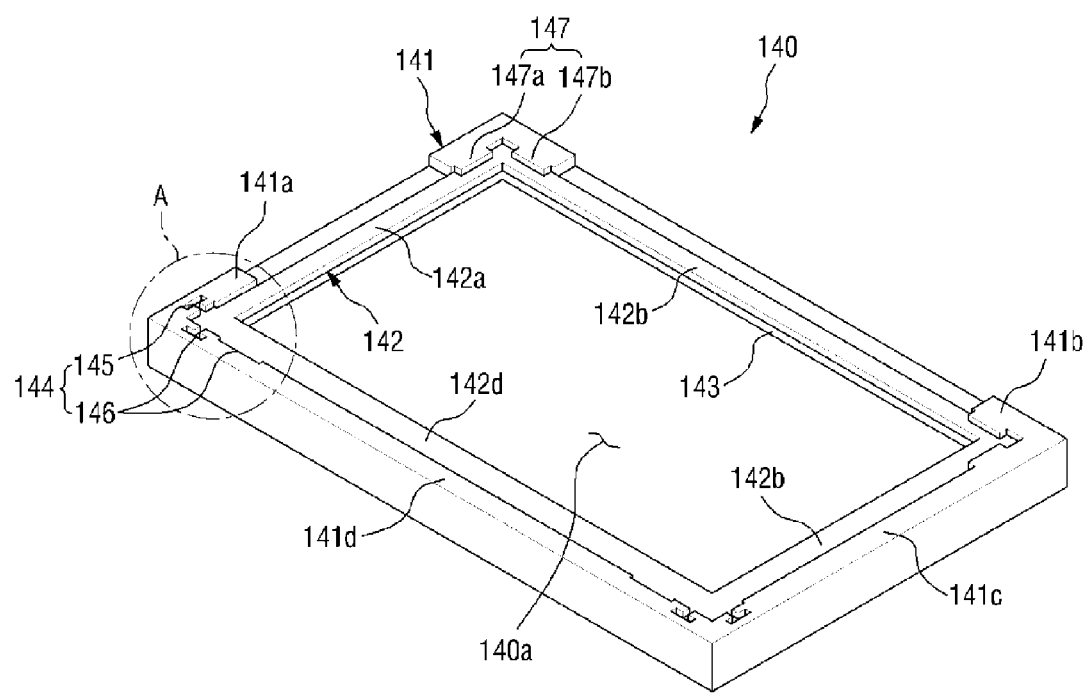
FIG. 5 is a perspective view of the mold frame of FIG. 3.
Figure 6:
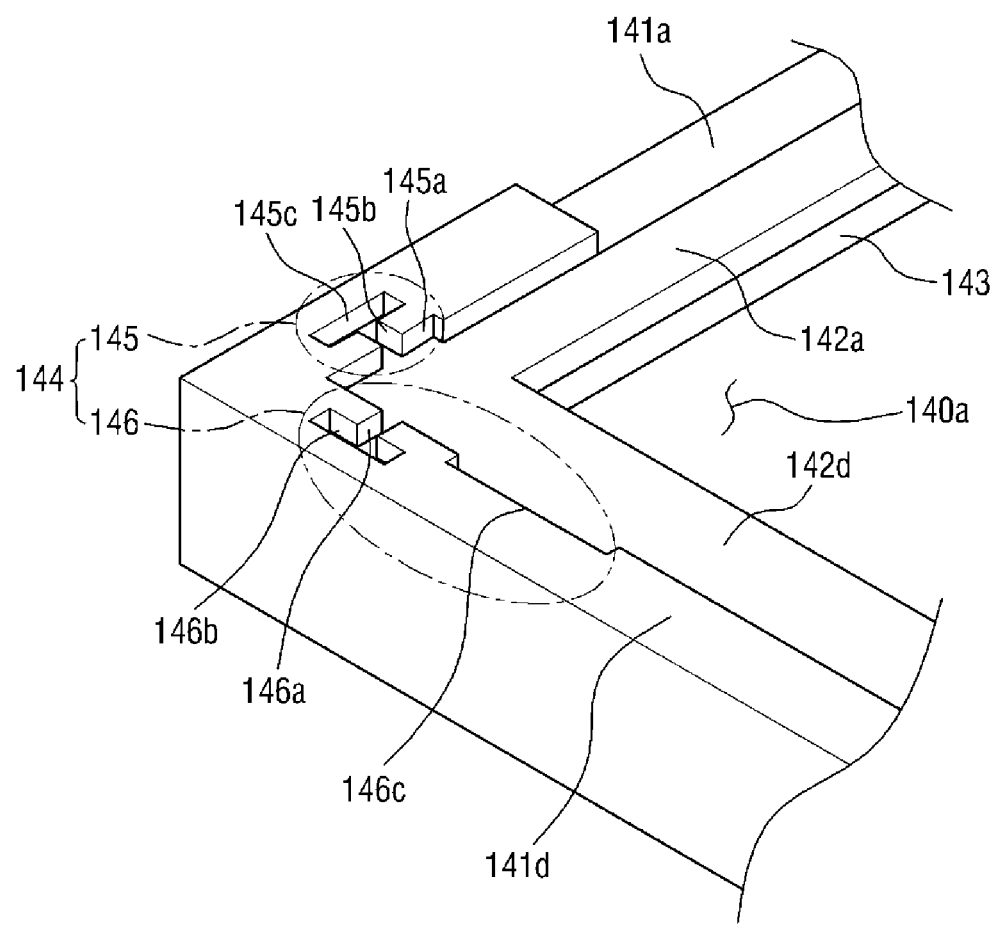
FIG. 6 is an enlarged perspective view of portion A of FIG. 5.

Referring to FIGS. 5 and 6, the mold frame 140 includes the sidewall portion 141, the support portion 142, the extension portion 143, the coupling groove portion 144, and the guide protrusion portion 147.

The sidewall portion 141 may include first, second, third, and fourth sidewalls 141a, 141b, 141c, and 141d, which form the shape of a rectangular band. Parts of the first and second sidewalls 141a and 141b corresponding to the FPCBs (121 of FIG. 1) may have a smaller height than the rest of the first and second sidewalls 141a and 141b, and the FPCBs (121 of FIG. 1) may be disposed to be mounted on the first and second sidewalls 141a and 141b, respectively when the display panel (110 of FIG. 1) is disposed on the support portion 142.

The support portion 142 may include first, second, third, and fourth supports 142a, 142b, 142c, and 142d, which extend from the lower ends of the inner surfaces of the first through fourth sidewalls 141a through 141d, respectively, toward the opening 140a. The top surfaces of the first through fourth supports 142a through 142d may be lower than the top surfaces of the first through fourth sidewalls 141a through 141d, respectively. In response to the display panel 110 being mounted on the first through fourth supports 142a through 142d, the display panel 110 may be surrounded by the first through fourth sidewalls 141a through 141d, and may thus have a stable state.

The extension portion 143 is formed to extend from each of the first through fourth sidewalls 141a through 141d toward the backlight unit (130 of FIG. 1), and is coupled to the sidewalls (131b of FIG. 2) of the lower container (131 of FIG. 2).

The coupling groove portion 144 is formed on at least one inner side of the sidewall portion 141, and includes a plurality of grooves, which are formed as indentations in the sidewall portion 141 from the opening 140a and are orthogonal to one another, as illustrated in FIG. 6. The coupling groove portion 144 prevents the protective member 150 from being detached from the mold frame 140.

In response to the sidewall portion 141 including the first through fourth sidewalls 141a through 141d, the coupling groove portion 144 may be formed to include two coupling grooves 145, 146, which are formed at, at least one of the four corners of the mold frame 140 where the first through fourth sidewalls 141a through 141d meet each other. In an exemplary embodiment, the coupling groove portion 144 may include a first coupling groove 145, which is formed on the inner side of the first sidewall 141a, and a second coupling groove 146, which is formed on the inner side of the fourth sidewall 141d.

The first coupling groove 145 may include a plurality of grooves, for example, first, second and third grooves 145a, 145b and 145c, which are formed as indentations into the first sidewall 141a, as illustrated in FIG. 6. Each of the third, second and first grooves 145c, 145b and 145a may be formed in an "I" shape.

The second coupling groove 146 may include a plurality of grooves, for example, fourth and fifth grooves 146a and 146b, which are formed as indentations into the fourth sidewall 141d, as illustrated in FIG. 6. The fifth and fourth grooves 146b and 146a may together form a "T" shape. The second coupling groove 146 may also include a sixth groove 146c, which is disposed near the fourth and fifth grooves 146a and 146b and is also formed as an indentation into the fourth sidewall 141d.

Because the first coupling groove 145 and the second coupling groove 146 are formed in different shapes, the protective member 150, which is formed in one piece, may be prevented from being inserted in a wrong direction into the coupling groove portion 144.

The coupling groove portion 144 may be formed at the corner of the mold frame 140 where the first and fourth sidewalls 141a and 141d meet, but may also be formed at the corner of the mold frame 140 where the third and fourth sidewalls 141c and 141d meet, as illustrated in FIG. 5.

The guide protrusion portion 147 may be formed to protrude from the sidewalls located at the corner where the coupling groove portions are not formed among the four corners where the first through fourth sidewalls 141a through 141d meet each other to form the opening 140a. The guide protrusion portion 147 may guide the display panel (110 of FIG. 1) to be properly mounted on the support portion 142. The guide protrusion portion 147 may be placed in contact with, or may be isolated from, the sides of the display panel (110 of FIG. 1).

In an exemplary embodiment, the guide protrusion portion 147 may include two guide protrusions, which are formed at the corner of the sidewall portion 141 where the first and second sidewalls 141a and 141b meet, i.e., a first guide protrusion 147a, which protrudes from the inner side of the first sidewall 141a toward the opening 140a, and a second guide protrusion 147b, which protrudes from the inner side of the second sidewall 141b toward the opening 140a. The guide protrusion portion 147 may also be formed on the corner of the sidewall portion 141 where the second and third sidewalls 141b and 141c meet, as illustrated in FIG. 5.

Figure 7:
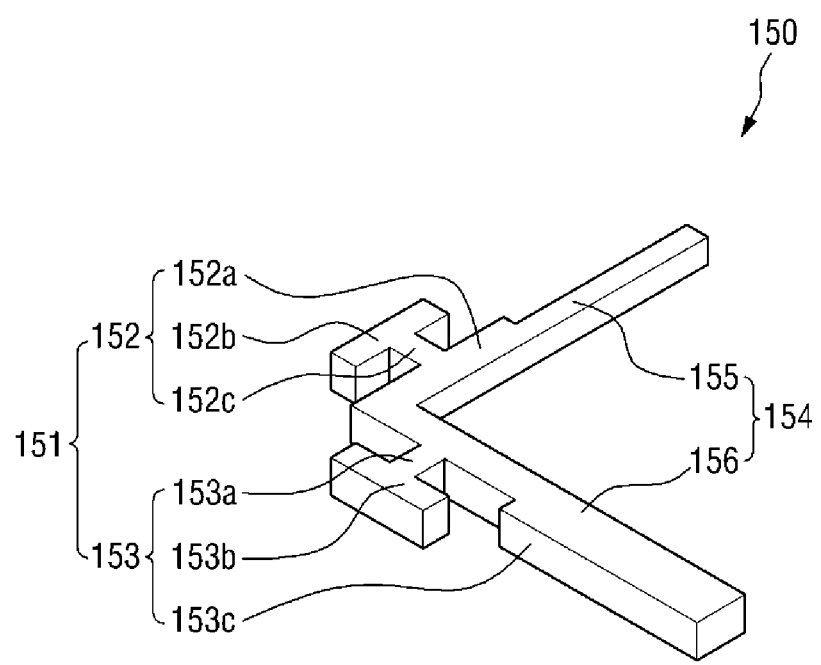
FIG. 7 is a perspective view of one of the protective members of FIG. 3.

Referring to FIG. 7, the protective member 150 includes a coupling protrusion portion 151 and a contact portion 154.

The coupling protrusion portion 151 is inserted into the coupling groove portion 144, and includes a plurality of protrusions, which are orthogonal to one another. Accordingly, the mold frame 140 and the protective member 150 may be firmly coupled together by the coupling protrusion portion 151 and the coupling groove portion 144 without the aid of an additional tape or adhesive.

In response to the coupling groove portion 144 including the first and second coupling grooves 145 and 146, which are formed on the inner side of the first and fourth sidewalls 141a and 141d, respectively, at the corner of the sidewall portion 141 where the first and fourth sidewalls 141a and 141d meet, the coupling protrusion portion 151 may include a first coupling protrusion 152, which is inserted into the first coupling groove 145, and a second coupling protrusion 153, which is inserted into the second coupling groove 146.

The first coupling protrusion 152 may include a plurality of protrusions, i.e., first, second and third protrusions 152a, 152b, and 152c, which are inserted into the first, second and third grooves 145a, 145b, and 145c, respectively, of the first coupling groove 145. Each of the third, second and first protrusions 152c, 152b, and 152a may be formed in an "I" shape.

The second coupling protrusion 153 may include a plurality of protrusions, i.e., fourth and fifth protrusions 153a and 153b, which are inserted into the fourth and fifth grooves 146a and 146b, respectively, of the second coupling groove 146. The fourth and fifth protrusions 153a and 153b may form a "T" shape together. The second coupling protrusion 153 may also include a third protrusion 153c, which is inserted into the sixth groove 146c of the second coupling groove 146.

The contact portion 154 is disposed between the inside of the sidewall portion 141 and the outside of the display panel 110, and is connected to the coupling protrusion portion 151. The contact portion 154 contacts the top surface of the support portion 142, the inside of the sidewall portion 141, and the outside of the display panel 110.

The contact portion 154 may include a first contact 155, which is connected to the first coupling protrusion 152 and is disposed between the inner side of the first sidewall 141a and the corresponding outer side of the display panel (110 of FIG. 1), and a second contact 156, which is connected to the second coupling protrusion 153 and is disposed between the inner side of the fourth sidewall 141d and the corresponding outer side of the display panel (110 FIG. 1). The first and second contacts 155 and 156 are provided between the display panel (110 FIG. 1) and the corner of the sidewall portion 141 where the first and fourth sidewalls 141a and 141d meet to form an "L" shape together, and may thus lower the risk of the display panel (110 of FIG. 1), which is susceptible to external shock, cracking or breaking in the corners. Also, because the thickness of the first and second contacts 155 and 156 may be easily adjusted by a simple manufacturing process without the need to modify the mold frame 140, the gap between the mold frame 140 and the display panel (110 of FIG. 1) may be freely adjusted.

The protective member 150 may be provided between the display panel (110 of FIG. 1) and the corner of the sidewall portion 141 where the first and fourth sidewalls 141a and 141d meet, but may also be provided between the display panel (110 of FIG. 1) and the corner of the sidewall portion 141 where the third and fourth sidewalls 141c and 141d meet, as illustrated in FIGS. 4 and 5.

The display device 100 includes the mold frame 140 having the coupling groove portion 144, and the protective member 150 having the coupling protrusion portion 151, which is formed of an elastic material and is inserted into the coupling groove portion 144, and the contact portion 154, which is provided between the mold frame 140 and the display panel 110. Accordingly, the risk of partial breakage of the display panel 110, especially in the corners, due to external shock may be reduced.

In addition, the mold frame 140 and the protective member 150 may be firmly coupled and fixed together by inserting the coupling protrusion portion 151 into the coupling groove portion 144 without the aid of an additional tape or adhesive. Also, because the contact portion 154 of the protective member 150 may be easily adjusted by a simple manufacturing process without the need to modify the mold frame 140, the gap between the mold frame 140 and the display panel 110 may be easily adjusted.

Moreover, as a result of the elasticity of the protective member 150, the pressure applied by the mold frame 240 to a specific part of the display panel 110 may be reduced. Accordingly, light leakage that may be caused by a pressed display panel 110 during the driving of the display device 100 may be reduced.

A display device according to another exemplary embodiment of the invention will hereinafter be described with reference to FIGS. 8 to 10.

The display device of FIGS. 8 to 10 has the same structure as the display device 100 of FIG. 1 except for a few elements such as a mold frame 240 and protective members 250, and thus will hereinafter be described, focusing mainly on the mold frame 240 and the protective members 250.

Figure 8:
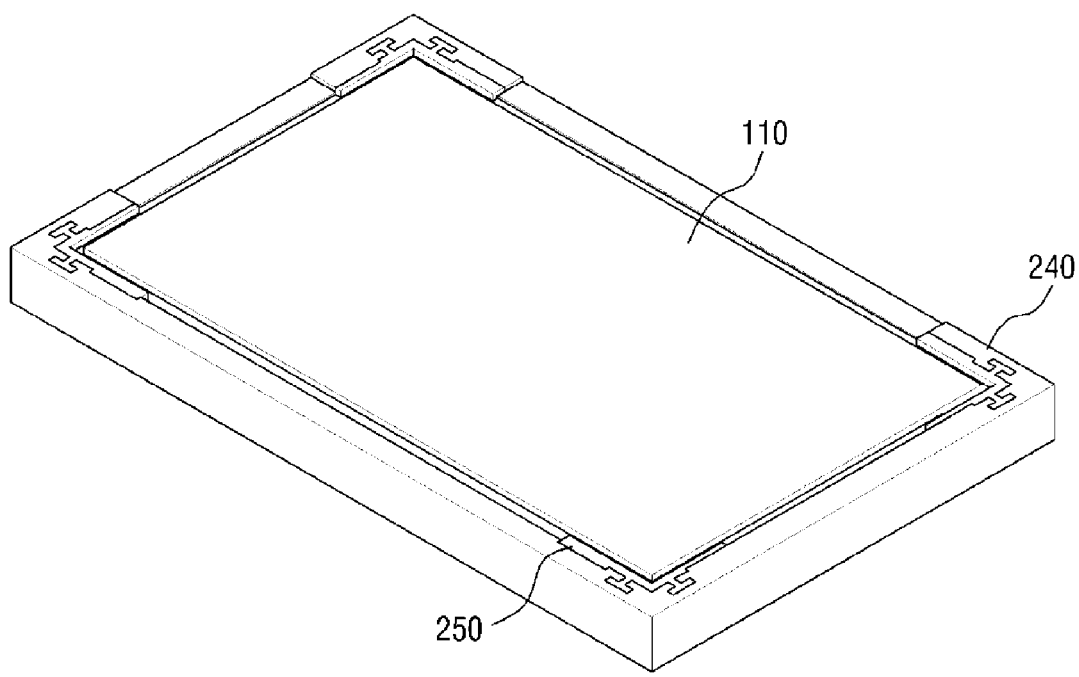
FIG. 8 is an assembled perspective view of a display panel, a mold frame and protective members of a display device according to another exemplary embodiment of the invention.
Figure 9:
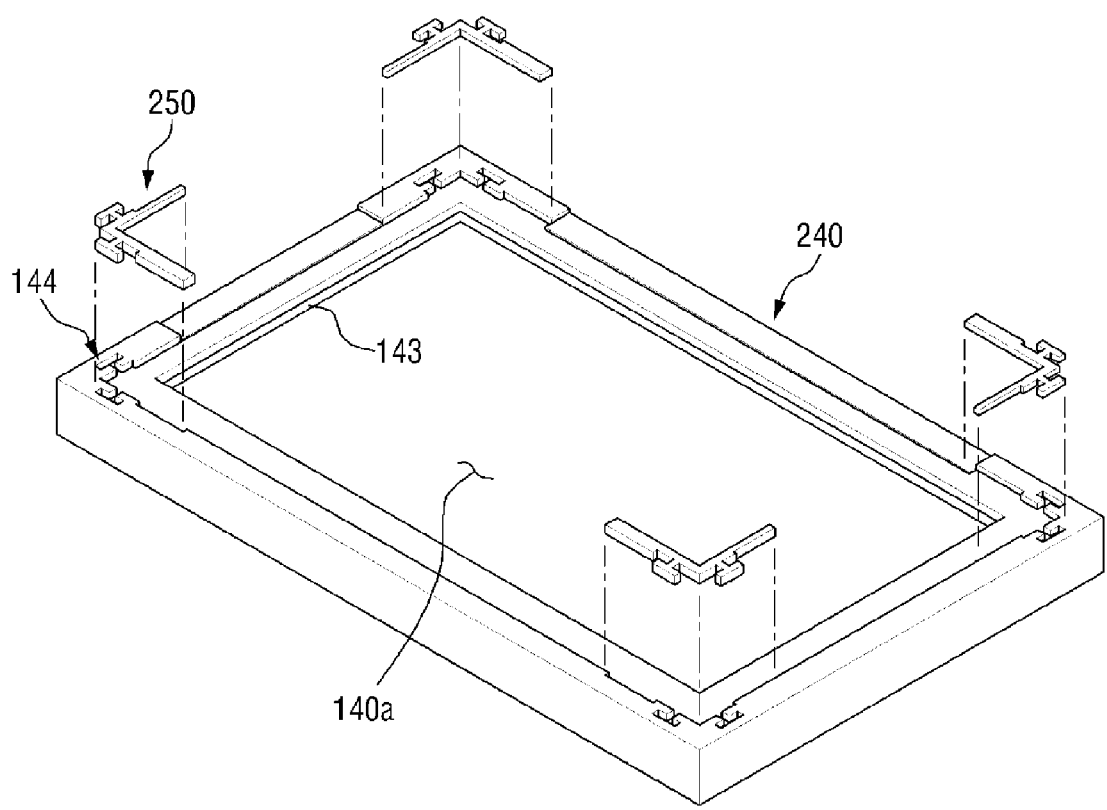
FIG. 9 is an exploded perspective view of the mold frame and the protective members of FIG. 8.
Figure 10:
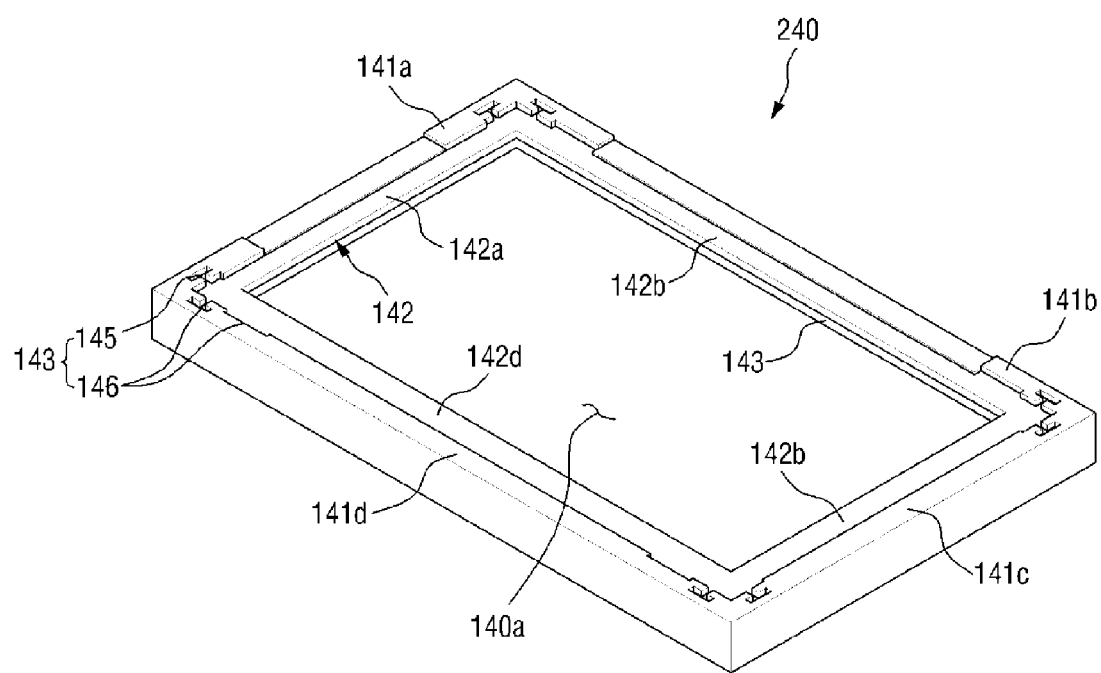
FIG. 10 is a perspective view of the mold frame of FIG. 8.
Figure 11:
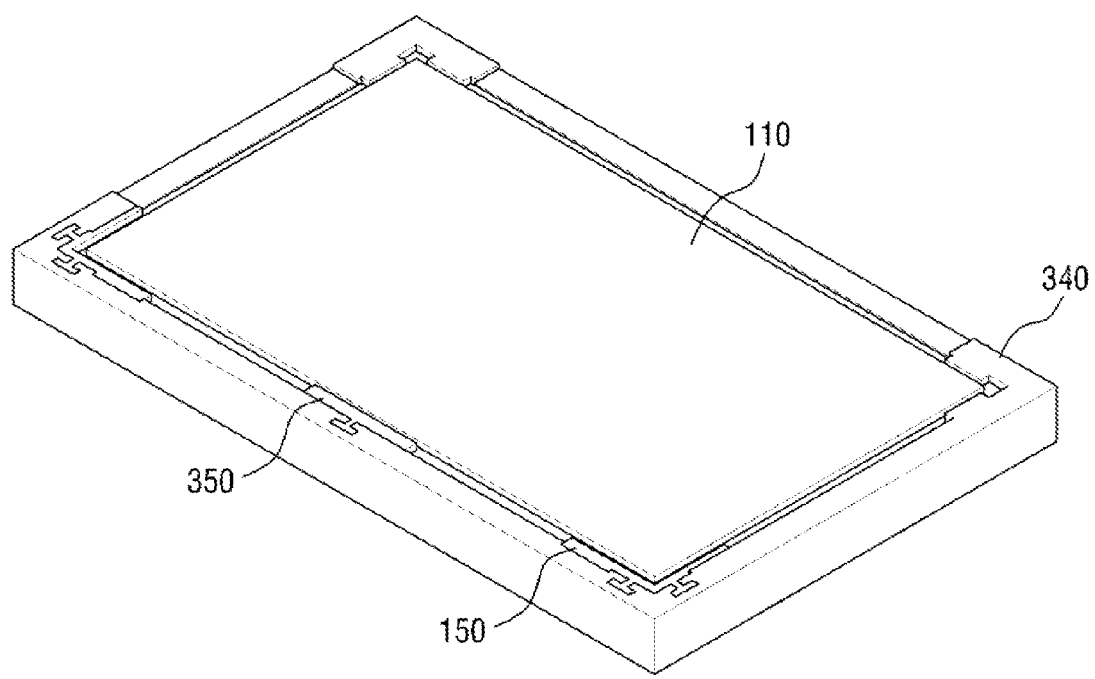
FIG. 11 is an assembled perspective view of a display panel, a mold frame, protective members, and an auxiliary protective member of a display device according to another exemplary embodiment of the invention.
Figure 12:
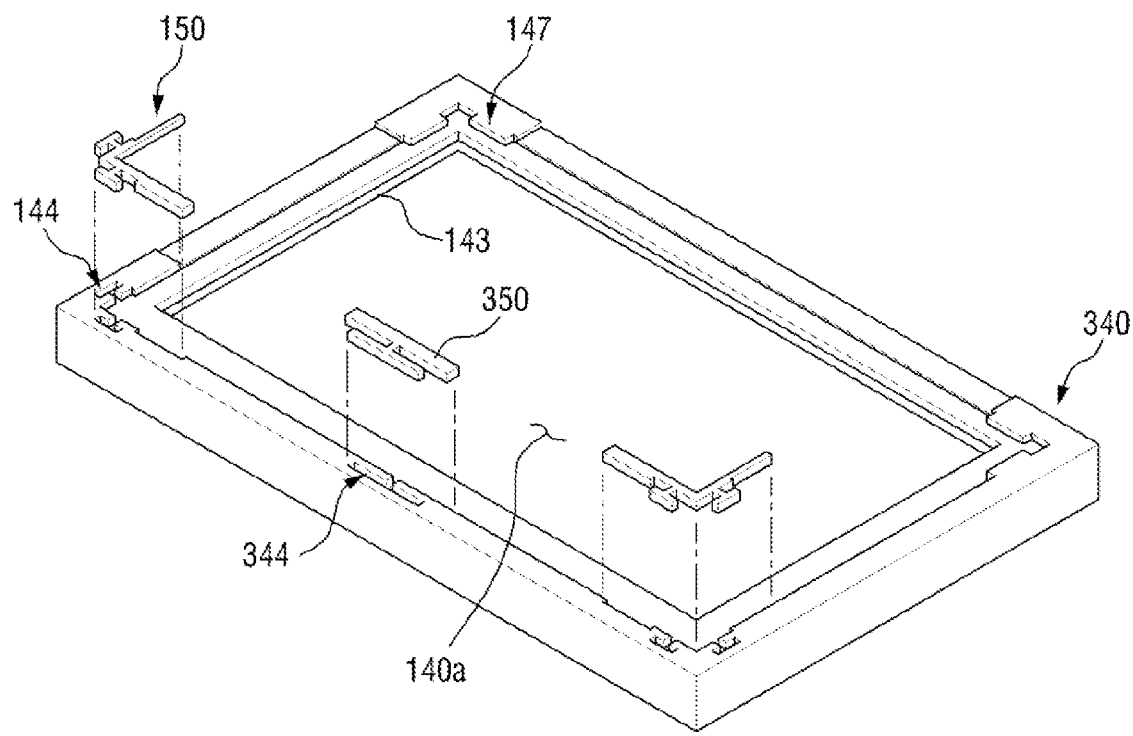
FIG. 12 is an exploded perspective view of the mold frame, the protective members and the auxiliary protective member of FIG. 11.
Figure 13:
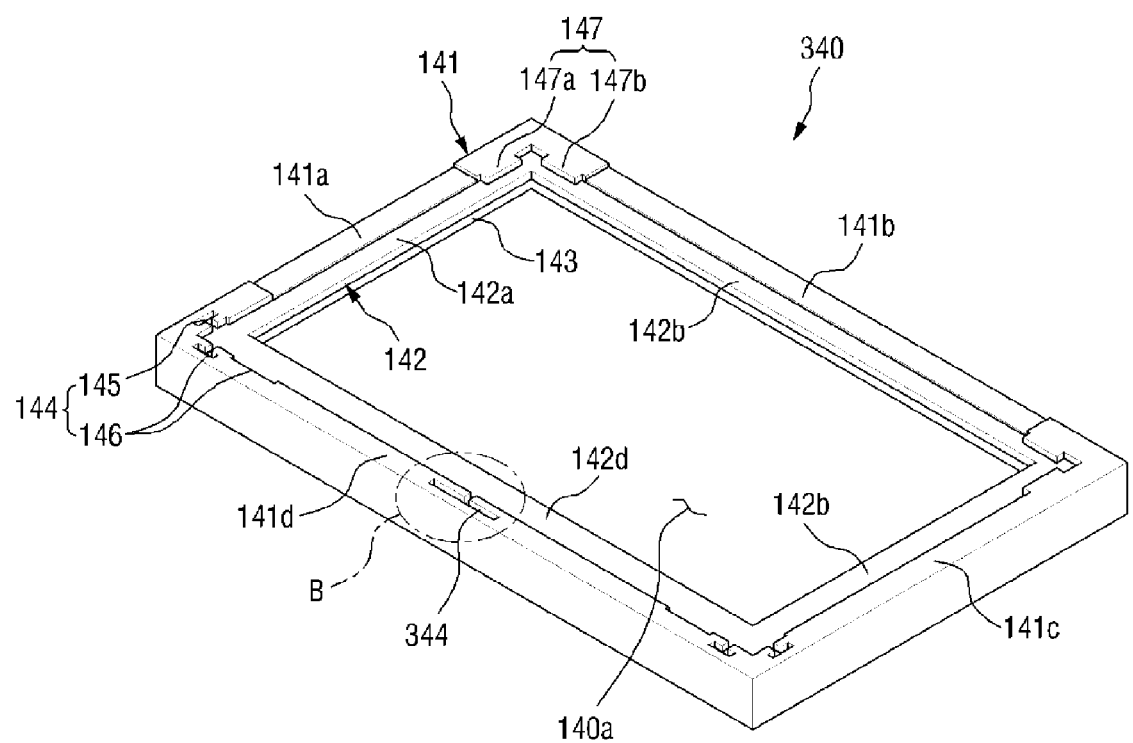
FIG. 13 is a perspective view of the mold frame of FIG. 11.
Figure 14:
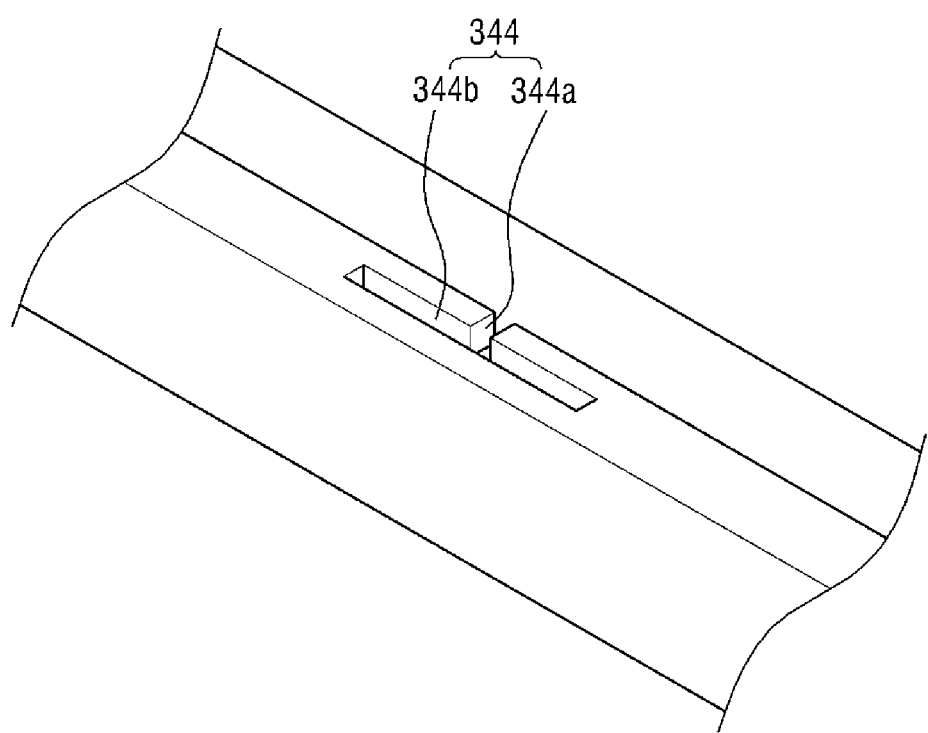
FIG. 14 is an enlarged perspective view of portion B of FIG. 13.

Referring to FIGS. 8 to 10, the mold frame 240 is similar to the mold frame 140 of FIG. 5 except that four coupling groove portion 144 are provided at all of the four corners, respectively, of the mold frame 240 where first through fourth sidewalls 141a through 141d meet one another. The coupling groove portions 144 are the same as the coupling groove portion 144 of FIG. 5, and thus, a detailed description thereof will be omitted.

The protective members 250 are similar to the protective member 150 of FIG. 7 except that a total of four protective members 250 are provided and coupled into the coupling groove portions 144, respectively, which are formed at the four corners, respectively, of the mold frame 240 where the first through fourth sidewalls 141a through 141d meet.

Because four protective members 250 are provided at the four corners, respectively, of the mold frame 240 where the first through fourth sidewalls 141a through 141d meet, the movement of a display panel 110 may be effectively reduced, and the display panel 110 may be effectively prevented from cracking or breaking due to external shock.

The display device of FIGS. 8 to 10 includes the mold frame 240, which has the coupling groove portions 144, and the protective members 250, which are formed of an elastic material, and the protective members 250 include coupling protrusion portions 151, respectively, which are coupled into the coupling groove portions 144, respectively, and contact portions 154, respectively, which are disposed between the mold frame 240 and the display panel 110. Accordingly, the display panel 110 may be effectively prevented from cracking or breaking, especially in the corners, due to external shock.

As a result of the elasticity of the protective members 250, the pressure applied by the mold frame 240 to a certain part of the display panel 110 may be reduced. Accordingly, light leakage that may be caused by a pressed display panel 110 during the driving of the display device of FIGS. 8 to 10 may be reduced.

A display device according to another exemplary embodiment of the invention will hereinafter be described with reference to FIGS. 11 to 15.

The display device of FIGS. 11 to 15 has the same structure as the display device 100 of FIG. 1 except that it further includes an auxiliary coupling groove portion 344 and an auxiliary protective member 350, and thus will hereinafter be described, focusing mainly on the auxiliary coupling groove portion 344 and the auxiliary protective member 350.

Referring to FIGS. 11 to 15, a mold frame 340 includes a sidewall portion 141, a support portion 142, an extension portion 143, a coupling groove portion 144, a guide protrusion portion 147, and an auxiliary coupling groove portion 344.

The sidewall portion 141, the support portion 142, the extension portion 143, the coupling groove portion 144, and the guide protrusion portion 147 are the same as their respective counterparts of FIG. 1, and thus detailed descriptions thereof will be omitted.

Figure 15:
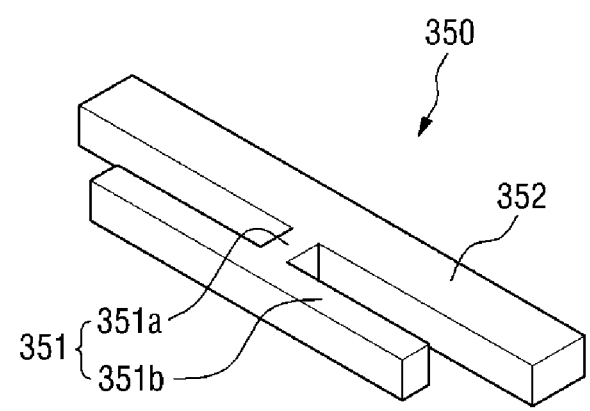
FIG. 15 is a perspective view of the auxiliary protective member of FIG. 11.

The auxiliary coupling groove portion 344 may be formed on a sidewall between coupling groove portions 144, which are formed on a pair of adjacent corners, respectively, of a mold frame 340, among the four corners where first through fourth sidewalls 141a through 141d meet. For example, the auxiliary coupling groove portion 344 may be formed on the inner side of a middle portion of the fourth sidewall 141d. The auxiliary coupling groove portion 344 includes a plurality of grooves 344a and 344b, which are formed as indentations into the fourth sidewall 141d from an opening 340a and are orthogonal to each other. For example, the auxiliary coupling groove portion 344 may include first and second auxiliary grooves 344a and 344b. The second and first auxiliary grooves 344b and 344a may together form a "T" shape. The auxiliary coupling groove portion 344 may be coupled to an auxiliary coupling protrusion portion 351 of the auxiliary protective member 350, as illustrated in FIG. 15, and may thus prevent the auxiliary protective member 350 from being detached from the mold frame 340.

The auxiliary protective member 350 is disposed between the mold frame 340 and a display panel 110, and is coupled to the mold frame 340. The auxiliary protective member 350 is formed of an elastic material, such as silicon or rubber, and includes an auxiliary coupling protrusion portion 351 and an auxiliary contact portion 352.

The auxiliary coupling protrusion portion 351 is inserted into the auxiliary coupling groove portion 344. For example, the auxiliary coupling protrusion portion 351 includes a plurality of protrusions 351a and 351b, which are orthogonal to each other. The mold frame 340 and the auxiliary protective member 350 may be firmly coupled to each other by the auxiliary coupling protrusion portion 351 and the auxiliary coupling groove portion 344. For example, the auxiliary coupling protrusion portion 351 may include first and second auxiliary protrusions 351a and 351b. The second and first auxiliary protrusions 351b and 351a may together form a "T" shape.

The auxiliary contact portion 352 is disposed between the inner side of the sidewall portion 141 and the display panel 110, and is connected to the auxiliary coupling portion 351. The auxiliary contact portion 352 contacts the top surface of the support portion 142, the inside of the sidewall portion 141, and the outside of the display panel 110. The auxiliary contact portion 352 supports the display panel 110 in a manner similar to the contact portion 154 of FIG. 7. Even in a case when the display panel 110 is of a midsize or a large size, the display panel 110 may be stably supported, the movement of the display panel 110 may be effectively reduced, and the display panel 110 may be effectively protected against external shock.

The display device of FIGS. 11 to 15 includes the mold frame 340, which has the coupling groove portions 144 and the auxiliary coupling groove portion 344, protective members 150, which are formed of an elastic material, and the auxiliary protective member 350, which is formed of an elastic material. The protective members 150 include coupling protrusion portions 151, respectively, which are coupled into the coupling groove portions 144, respectively, and contact portions 154, respectively, which are disposed between the mold frame 340 and the display panel 110. The auxiliary protective member 350 includes the auxiliary coupling protrusion portion 351, which is coupled into the auxiliary coupling groove portion, and the auxiliary contact portion 352, which is disposed between the mold frame 340 and the display panel 110. Accordingly, even in a case when the display panel 110 has a large size, the risk of the display panel 110 cracking or breaking as a result of external shock may be effectively reduced.

Also, as a result of the elasticity of the protective members 150 and the auxiliary protective member 350, the pressure applied by the mold frame 340 to a certain part of the display panel 110 may be reduced. Accordingly, light leakage that may be caused by a pressed display panel 110 during the driving of the display device of FIGS. 11 to 15 may be reduced.

According to the above-described exemplary embodiments, because a mold frame has a coupling groove portion and a protective member formed of an elastic material has a coupling protrusion portion coupled into the coupling groove portion, and a contact portion is disposed between a mold frame and a display panel, the display panel may be prevented from cracking or breaking, especially in the corners, due to external shock.

In addition, the mold frame and the protective member may be firmly fixed together by inserting the coupling protrusion portion into the coupling groove portion without the aid of an additional tape or adhesive. Moreover, because the thickness of the contact portion of the protective member may be easily adjusted by a simple manufacturing process without the need to modify the mold frame, the gap between the mold frame and the display panel may be freely adjusted.

Furthermore, as a result of the elasticity of the protective member, the pressure applied by the mold frame to a certain part of the display panel may be reduced. Accordingly, light leakage that may be caused by a pressed display panel during the driving of a display device may be reduced Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device, comprising:
a display panel;
a backlight unit disposed below the display panel and configured to provide light to the display panel;
a mold frame disposed between the display panel and the backlight unit, the mold frame comprising:
a sidewall portion defining an opening;
a support portion, which extends from the sidewall portion toward the opening and supports the display panel; and
at least one coupling groove portion formed on an inner side of the sidewall portion; and
at least one protective member comprising:

a coupling protrusion portion insertable into the coupling groove portion; and
a contact portion disposed between an inside of the sidewall portion and an outside of the display panel and connected to the coupling protrusion portion,
wherein:
the sidewall portion comprises first, second, third, and fourth sidewalls, which form the shape of a rectangular band;
the coupling groove portion is formed at, at least one of four corners where the first, second, third, fourth sidewalls meet one another;
the coupling groove portion comprises:
a first coupling groove, which is formed on an inner side of the first sidewall; and
a second coupling groove, which is formed on an inner side of the fourth sidewall;
the first coupling groove comprises a plurality of grooves;
the second coupling groove comprises a plurality of grooves; and
the shapes of the grooves of the first coupling groove are different from the shapes of the grooves of the second coupling groove.

2. The display device of claim 1, wherein the contact portion is configured to contact a top surface of the support portion, the inside of the sidewall portion, and the outside of the display panel.

3. The display device of claim 1, wherein the protective member is formed of an elastic material.

4. The display device of claim 1, wherein the protective member comprises rubber or silicon.

5. The display device of claim 1, wherein a top surface of the protective member and a top surface of the sidewall portion are on a same level with each other.

6. The display device of claim 1, wherein the plurality of grooves of the first and second grooves are orthogonal to each other.

7. The display device of claim 1, wherein:
the coupling protrusion portion comprises:
a first coupling protrusion configured to be coupled into the first coupling groove; and
a second coupling protrusion configured to be coupled into the second coupling groove;
the contact portion comprises:
a first contact connected to the first coupling protrusion and disposed between the inner side of the first sidewall and the corresponding outer side of the display panel; and
a second contact connected to the second coupling protrusion and disposed between the inner side of the fourth sidewall and the corresponding outer side of the display panel; and
the first contact and the second contact together form an "L" shape.

8. The display device of claim 1, wherein:
the coupling groove portion is formed at each of the corners where the first and fourth sidewalls meet and where the third and fourth sidewalls meet; and
the mold frame further comprises a guide protrusion portion formed at each of the corners where the first and second sidewalls meet and where the second and third sidewalls meet.

9. The display device of claim 1, wherein the mold frame further comprises:
an auxiliary coupling groove portion formed on an inner side of a middle portion of the sidewall between coupling groove portions that are formed on a pair of adjacent corners, respectively, among the four corners where first, second, third, and fourth sidewalls meet; and
an auxiliary coupling protrusion portion coupled into the auxiliary coupling groove portion.

10. The display device of claim 1, further comprising an upper container configured to cover top edges of the display panel,
wherein an inside of the upper container contacts a top surface of the protective member.

11. A display device, comprising:
a display panel;
a backlight unit disposed below the display panel and configured to provide light to the display panel;
a mold frame disposed between the display panel and the backlight unit and comprising:
a sidewall portion defining an opening;
a support portion extending from the sidewall portion toward the opening and supporting the display panel; and
at least one coupling groove portion formed on an inner side of the sidewall portion; and
at least one protective member formed of an elastic material, coupled into the coupling groove portion, and disposed between an inside of the sidewall portion and an outside of the display panel,
wherein:
the sidewall portion comprises first, second, third, and fourth sidewalls, which form the shape of a rectangular band;
the coupling groove portion is formed at, at least one of four corners where the first, second, third, fourth sidewalls meet one another;
the coupling groove portion comprises:
a first coupling groove, which is formed on an inner side of the first sidewall; and
a second coupling groove, which is formed on an inner side of the fourth sidewall;
the first coupling groove comprises a plurality of grooves;
the second coupling groove comprises a plurality of grooves; and
the shapes of the grooves of the first coupling groove are different from the shapes of the grooves of the second coupling groove.

12. The display device of claim 11, wherein the protective member comprises rubber or silicon.

13. The display device of claim 11, wherein the protective member comprises:
a coupling protrusion portion, which is insertable into the coupling groove portion; and
a contact portion contacting a top surface of the support portion, the inside of the sidewall portion, and the outside of the display panel.

14. The display device of claim 11, wherein a top surface of the protective member and a top surface of the sidewall portion are on a same level with each other.

15. The display device of claim 11, wherein the plurality of grooves of the first and second grooves are orthogonal to each other.

16. The display device of claim 1, wherein the mold frame further comprises:
an auxiliary coupling groove portion formed on an inner side of a middle portion of the sidewall between coupling groove portions that are formed on a pair of adjacent corners, respectively, among the four corners where the first, second, third, and fourth sidewalls meet; and an auxiliary coupling protrusion portion coupled into the auxiliary coupling groove portion.

\* \* \* \* \*